Jan. 29, 1963     I. A. ELLMAN     3,075,220
DEVICE FOR CLEANING A DENTIST'S MIRROR

Filed April 22, 1960     2 Sheets-Sheet 1

INVENTOR
IRVING A. ELLMAN
BY *Erwin Schneebaum*
ATTORNEY

Jan. 29, 1963  I. A. ELLMAN  3,075,220
DEVICE FOR CLEANING A DENTIST'S MIRROR
Filed April 22, 1960  2 Sheets-Sheet 2

INVENTOR.
IRVING A. ELLMAN
BY Erwin Schneebaum
ATTORNEY.

United States Patent Office 3,075,220
Patented Jan. 29, 1963

3,075,220
DEVICE FOR CLEANING A DENTIST'S MIRROR
Irving A. Ellman, 701 Brighton Beach Ave.,
Brooklyn 35, N.Y.
Filed Apr. 22, 1960, Ser. No. 24,090
1 Claim. (Cl. 15—145)

This invention relates broadly to dentists' appliances, and it has more specific reference to a device by means of which a dentist can quickly and easily clean his mirror and keep it free from haze and mist.

In the pursuit of his profession, a dentist usually holds a dental handpiece equipped with the proper attachment in one hand, and with his other hand he holds a small circular mirror through which he can more readily observe the progress of the work he is doing.

Dental handpieces of the kind now commonly in use are each equipped with a tube through which a spray of water is released when the handpiece is in use. Because the dentist must hold the mirror and the handpiece close to each other, the mirror is quickly spotted with beads of water from the spray and covered with a film of mist and haze, making it impossible to use the mirror for the purpose for which it is intended. In order to clean the mirror, the dentist must interrupt his work, remove the mirror from the position in which it had been held, rub it across a cleaning surface and then resume his work. The interruption of the work occurs at very frequent intervals, to the discomfort and annoyance of both the dentist and the patient.

With this in view, it is the principal object of the present invention to provide a device which is carried by a dentist in a convenient manner and which is available for instant use to clean a mirror without requiring the dentist to interrupt his work.

It is a further aim of the present invention to provide a ring adapted to removably receive and retain a piece of cotton across which the dentist can pass his mirror at will and without appreciably removing the mirror from the position in which it had been held.

And it is a further aim of the present invention to provide a ring on which a retainer member is positioned, the retainer member being adapted to removably retain a piece of cotton across which a mirror can readily be passed by the dentist using the device.

And yet another feature of the present invention resides in the provision of a ring, preferably worn by a dentist on the little finger of the hand holding the handpiece, the ring being formed from a unitary piece of wire in such fashion that it will form a carrier element for a ring piece of cotton upon the ring and a piercing element upon the carrier element which is adapted to pierce a piece of cotton.

These and other meritorious aims and advantages, which will become more fully apparent as the description hereof proceeds, are attained by the novel construction, combination and arrangement of few and simple parts, hereinafter described, and illustrated on the accompanying drawings, forming a material component of this disclosure, and in which.

Figure 14:
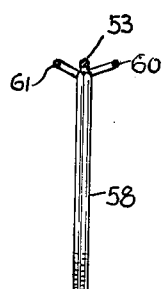

FIGURE 14 a fragmentary front elevational view of the device, showing a fragmentary portion of the carrier element.

Figure 1:
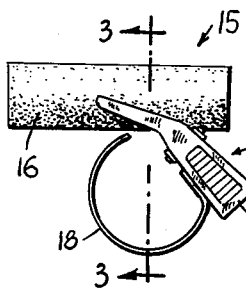
FIGURE 1 is a side elevational view of a modified form of the device, showing a ring having a retainer member thereon, the retainer illustrated as retaining a tubular segment of cotton.
Figures 2, 3:
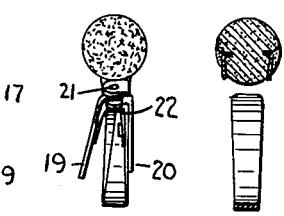
FIGURE 2 is an end view of the device illustrated in FIGURE 1.
FIGURE 3 is a sectional view of the mirror cleaning device, the section being taken on line 3—3 of FIGURE 1.

Referring in greater detail to the drawing, the numeral 15 relates broadly to the embodiment of the present invention, illustrated in FIGURES 1, 2 and 3, and the reference numeral 17 relates broadly to the clamp member which is a part thereof, clamp member 17 being illustrated as holding a tubular segment of cotton 16 between its jaws.

Clamp member 17 is illustrated as being mounted upon a ring 18 in any suitable and desirable manner, such as for instance by soldering. Clamp 17 is illustrated as having a pair of jaw members 19 and 20 respectively, having a hinge member referred to by the numeral 21 which is controlled by spring 22 in such manner that the free ends of jaws 19 and 20 are normally urged away from each other and the cotton retaining ends are normally urged towards each other.

Figures 4, 5:
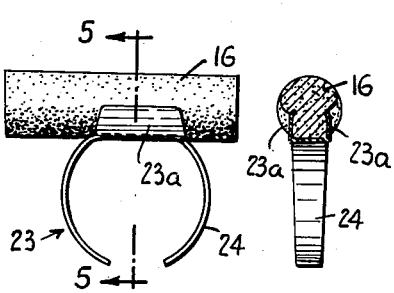
FIGURE 4 is a modification of the mirror cleaning device which constitutes the subject-matter of the present application, the modification showing a ring having a carrier member thereon, in which a tubular segment of cotton is engaged.
FIGURE 5 is a sectional view of the modification illustrated in FIGURE 4, the section being taken on line 5—5 of FIGURE 4.

The modified form of the invention illustrated in FIGURES 4 and 5 is broadly referred to by the numeral 23. Device 23 comprises a ring 24 having a substantially channel shaped retaining element 23a thereon, in which a tubular segment of cotton 16 is removably retained.

Figure 6:
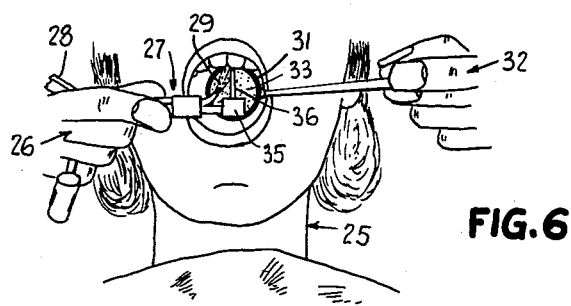
FIGURE 6 illustrates a section of a patient's face, and it further shows the two hands of a dentist, the right hand holding a dental handpiece and the left hand holding a mirror, the little finger of the right hand wearing a ring which is constructed according to the present invention.
Figure 7:
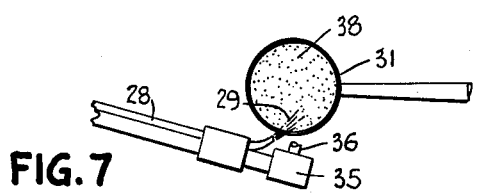
FIGURE 7 shows a section of a water-releasing tube which is a part of a dental handpiece, and it also shows a mirror in the relative position in which it is held when the dentist uses it, illustrating the manner in which a mirror becomes covered with mist and spray because of the water released by the tube.
Figure 8:
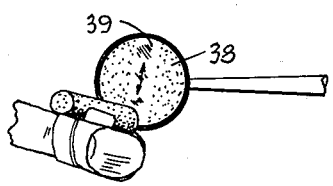
FIGURE 8 shows the manner in which a mirror is wiped clean of mist and haze by a device constructed in accordance with the present invention.

The use of the device is simple, as will become apparent from an inspection of FIGURES 6 through 8.

At 25, there is illustrated a portion of the face of a patient on whom dental work is being done. The dentist's right hand 26 holds a conventional handpiece 27 having a water supply tube 28 thereon from which a spray of water 29 is released when the handpiece is in use. Inasmuch as the handpiece is conventional and does not form a part of the present invention, it will not be illustrated or described in more complete detail.

With his left hand 32, the dentist is illustrated as holding a conventional circular mirror 31 through which he views the progress of his work. At 33, mirror 31 is illustrated as being covered with a film of haze or mist. For the purpose of illustration, the handpiece 27 is shown as terminating in a head 35 having an attachment 36 therein. The little finger of the hand in which he holds handpiece 27 is shown as being provided with a cleaning device of the present invention, the hand being referred to by the numeral 26.

When it is desired to use the device illustrated in FIGURE 1, the dentist will press the free ends of jaws 19 and 20 together, thereby separating the other ends so as to receive a tubular segment of cotton therebetween. Release of pressure will clamp the tube of cotton between the jaws. The dentist will then place the ring on the little finger of the hand with which he holds his handpiece. It may be desirable to dip the cotton into a mirror cleaning solution. Many good solutions for this purpose are on the market. As the dentist uses his handpiece and his mirror in a conventional manner, and as the mirror becomes covered with beads of water and with haze in the manner illustrated in FIGURES 7 and 8 at 38, all the dentist need do is to bring the mirror closer to the hand in which he holds the handpiece 27 and, by merely passing the mirror across the cotton on the cleaning device, he will at once free it from water and haze, as at 39 in FIGURE 8. The dentist can repeat this procedure as many times as he finds necessary, without interfering appreciably with the progress of the work in which he is engaged.

When a dentist desires to use the embodiment of the invention illustrated in FIGURES 4 and 5 all he need do is to enter a tubular segment of cotton in the holder 23a. The contour of the said holder is such that it will hold the cotton firmly in position.

The preferred form of the invention is illustrated in FIGURES 9 through 14 of the drawings. In this structure, the ring member and the cotton retaining member are formed from a unitary piece of material such as wire which is bent to form the embodiment herein referred to.

Figure 11:
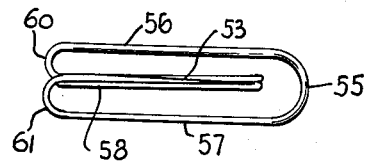
FIGURE 11 is a detail view of the carrier member which is adapted to removably carry a segment of cotton with which to clean a dentist's mirror.
Figure 13:
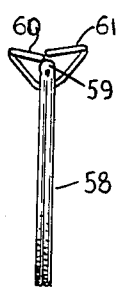
FIGURE 13 is a view similar to FIGURE 10 but showing the device without a segment of cotton thereon.
Figure 12:
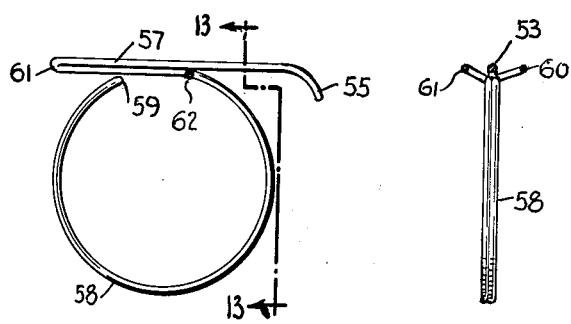
FIGURE 12 is a view similar to FIGURE 9 but showing the device without a segment of cotton therein.

A piece of wire or other suitable and desirable material is curved to form a finger-embracing or ring element 58. At 59 it is curved forward in a horizontal manner, then laterally outward at 60, thence back as at 56, the segment 56 being spaced from and parallel with segment 57. At 55 the wire 56 is bent transversely, constituting the opposite end and following the general direction of the segment 60, the segment 55 being wider than 60 and being curved downwardly as illustrated in FIGURE 12 for a purpose which will hereinafter be more fully described. Segment 56 is then bent rearwardly as at 57, the said segment 57 being spaced from and parallel with segment 56. The segments 56 and 57 constitute the normally horizontal limits of the carrier member. Segment 57 is then bent upwardly again in the direction of segment 61, the width of segments 60 and 61 being equal to that of segment 55 as is shown in FIGURE 11 of the drawings. Segment 60 is bent inwardly towards 55 and segment 61 is bent inwardly towards segment 55, as at 53 and 58 respectively, segment 53 illustrated as terminating in a sharp point for a purpose which will hereinafter become more fully apparent. Segment 58 may be bent upon itself as at 59 if desired, thereby forming a two-ply ring element for greater sturdiness. Segments 56 and 57 may be raised slightly out of their plane, thereby forming a cradle for a roll of cotton adapted to rest therebetween, the cotton being identified by the numeral 52. The free end of the wire is soldered to the ring member 58 at 62.

Figure 10:
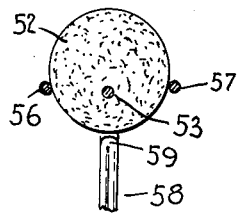
FIGURE 10 is an end view of the device illustrated in FIGURE 9.
Figure 9:
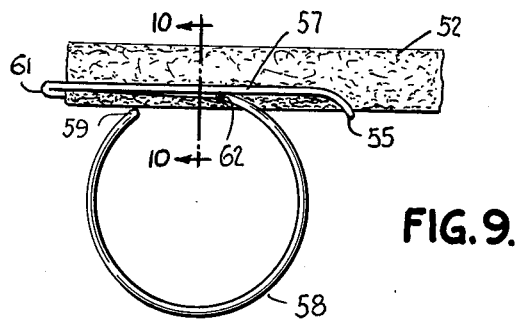
FIGURE 9 is a side elevational view of the preferred form of the present invention comprising a dental mirror cleaning device formed from a unitary strand of wire which is bent to form a ring upon which a retaining element is seated which is provided with a piercing segment which is illustrated as having pierced a tubular segment of cotton.

The operation of the device is simple. The downward curvature of segment 55 allows a quick and easy entrance of the roll of cotton 52 into its cradle, the sharp point of the segment 53 will pierce the cotton and hold it in place, as is shown in FIGURE 10.

Thus there has been shown and described a mirror cleaning device for dentists in the principal form of its embodiment and in several modifications thereof. Certain modifications are apparent and others will become apparent through use. For instance, when a clamp member is used, the jaws may be provided with teeth for still greater security in holding the cotton. The device has been described throughout as being adapted for use in connection with cotton. The reason is that cotton serves both as means to wipe and to absorb. However, the use of the device is by no means restricted to cotton. A segment of sponge, or a segment of rubber, or a segment of any other suitable and desirable material can be used with equal effectiveness.

It is to be understood therefore that the foregoing is to be regarded as illustrative and descriptive only of the best known forms of the invention, but not as limitative or restrictive as the exact details shown, applicant reserving the right to make such changes therein as might come within the scope of the appended claims, without thereby departing either from the spirit or the scope of the present invention.

Having thus described the invention, what is claimed as new and desired to secure by Letters Patent, is:

A device of the character described, said device made from a unitary piece of wire so curved that a finger ring is formed thereby, said wire further curved to form a holder for an elongated tubular segment of absorbent cotton, said holder extending transversely across the normally upper surface of said ring, said holder curved to form a pair of parallel elongated sides, said sides spaced apart to accommodate the segment of absorbent cotton therebetween, said wire further curved whereby said sides are provided with a pair of spaced-apart ends, and said wire further curved to form an elongated pin-like piercing element, said piercing element extending from one end of said holder toward said other end of said holder substantially midway between said sides whereby to pierce the tubular segment of cotton longitudinally substantially through its center.

References Cited in the file of this patent

UNITED STATES PATENTS

| | | |
|---|---|---|
| 552,462 | Beiser | Dec. 31, 1895 |
| 1,482,319 | Price | Jan. 29, 1924 |
| 2,883,691 | Gruenwald | Apr. 28, 1959 |

FOREIGN PATENTS

| | | |
|---|---|---|
| 12,488 | Great Britain | 1892 |